(12) United States Patent
Chang et al.

(10) Patent No.: US 7,697,780 B2
(45) Date of Patent: Apr. 13, 2010

(54) SYSTEM AND METHOD FOR FILTERING IMAGE NOISE

(75) Inventors: Chih-Kuang Chang, Tu-Cheng (TW); Xiao-Chao Sun, Shenzhen (CN); Li Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 876 days.

(21) Appl. No.: 11/308,953

(22) Filed: May 29, 2006

(65) Prior Publication Data
US 2007/0003158 A1  Jan. 4, 2007

(30) Foreign Application Priority Data
Jul. 1, 2005  (CN) .......................... 2005 1 0035746

(51) Int. Cl.
G06K 9/40  (2006.01)
(52) U.S. Cl. ..................................... 382/260
(58) Field of Classification Search .................. 382/260
See application file for complete search history.

(56) References Cited

U.S. PATENT DOCUMENTS 5,797,396 A * 8/1998 Geiser et al. ................. 600/407
5,903,680 A   5/1999 De Haan et al.
5,943,441 A * 8/1999 Michael ....................... 382/199
6,504,625 B1 * 1/2003 Amero et al. ................. 358/1.9

FOREIGN PATENT DOCUMENTS

CN           1252978 C        4/2006

OTHER PUBLICATIONS

Author: Liu Wei, Ma Zhengming, Title of the article: Wavelet Image Threshold Denoising Based On Edge Detection, Title of the Magnazine: Journal of Image and Graphics, Date: Aug. 2002, pp. 6, Volume-issue number: vol. 7(A), No. 8, Published Country: China.

* cited by examiner

*Primary Examiner*—Bhavesh M Mehta
*Assistant Examiner*—Hadi Akhavannik
(74) *Attorney, Agent, or Firm*—Wei Te Chung

(57) ABSTRACT

A method for filtering image noise includes the steps of: acquiring an image; converting gray-scale values of the image and sharpening the image; defining axes perpendicular to image borders and selecting intersecting points between the axes and the image border; creating an object points set and inputting all the intersecting points into the object points set; fitting a geometric character according to the object points set; defining a tolerance threshold value; selecting an intersecting point from the object points set; calculating a distance from the selected intersecting point to the geometric character; determining whether the distance is larger than the defined tolerance threshold value; marking the selected intersecting point as a noise if the distance is larger than the defined tolerance threshold value; and deleting the selected intersecting point from the object points set. A related method is also disclosed.

18 Claims, 7 Drawing Sheets

SYSTEM AND METHOD FOR FILTERING IMAGE NOISE

FIELD OF THE INVENTION

The present invention relates to a system and method for image processing.

DESCRIPTION OF RELATED ART

Today, image capturing devices are relatively easy to use (e.g., cameras, scanners etc), however, many images produced by such devices may contain areas or regions of noise that can diminish the visual quality of the images. For example, an image may contain a pixel having a color that is inconsistent with the color of an adjacent or the surrounding pixel(s). Such irregularly colored pixels are commonly referred to as noise speckle(s). The image may also contain larger noise areas or regions (e.g., larger than one pixel). That is, the image may contain a group of adjacent pixels having a color or colors that are inconsistent with the color(s) of adjacent or surrounding pixels. Such irregularly colored groups of adjacent pixels are commonly referred to as noise splotches or blotches.

The cause or source of noise speckles and/or noise splotches in an image varies. For example, noise speckles and splotches may be especially problematic when relatively old traditional photographs are converted to the digital format with such noise being caused by the photograph's condition and/or the equipment being used to convert the photograph into digital format. In any event, noise arising from the same source (e.g., dust on the scanning bed, wrinkles in the source object, etc.) should have the same image data (e.g., color profile) associated with it. It becomes progressively difficult to identify an image region as being caused by noise as the area of the image region increases. The existence of the noise causes the image to be fuzzy that influences the accuracy of measurement.

What is needed, therefore, is a system and method that can filter out the noise in an image automatically.

SUMMARY OF INVENTION

A system for filtering image noise is provided. The system includes an image acquiring module for acquiring an image; a gray-scale converter for converting gray-scale values of the image, and for sharpening the image; an intersecting point selecting module for defining axes perpendicular to image borders, for determining gray-scale values of axis points, for selecting intersecting points between the image borders and the axes, for creating an object points set and for inputting the intersecting points into the object points set; and a noise filtering module for fitting a geometric character according to the object points set and defining a tolerance threshold value, for calculating a distance from each intersecting point in the object points set to the geometric character, for determining whether the distance is larger than the defined tolerance threshold value, and for marking the intersecting point as a noise and deleting the intersecting point if the distance is larger than the defined tolerance threshold value.

Furthermore, a method for filtering image noise is provided. The method includes the steps of: acquiring an image; converting gray-scale values of the image and sharpening the image; creating an object points set; defining axes perpendicular to image borders and selecting intersecting points between the axes and the image border; creating an object points set and inputting all the intersecting points into the object points set; fitting a geometric character according to the object points set; defining a tolerance threshold value; selecting an intersecting point from the object points set; calculating a distance from the selected intersecting point to the geometric character; determining whether the distance is larger than the defined tolerance threshold value; marking the selected intersecting point as a noise if the distance is larger than the defined tolerance threshold value; and deleting the selected intersecting point from the object points set.

Moreover, another system for filtering image noise is provided. The system includes an image acquiring module for acquiring an image; a gray-scale converter for converting gray-scale values of the image; an intersecting point selecting module for defining axes perpendicular to image borders, for selecting intersecting points between the image borders and the axes, for creating an object points set, and for inputting the intersecting points into the object points set; and a noise filtering module for fitting a geometric character according to the object points set.

Other advantages and novel features of the present invention will become more apparent from the following detailed description of preferred embodiments when taken in conjunction with the accompanying drawings.

DETAILED DESCRIPTION

Figure 1:
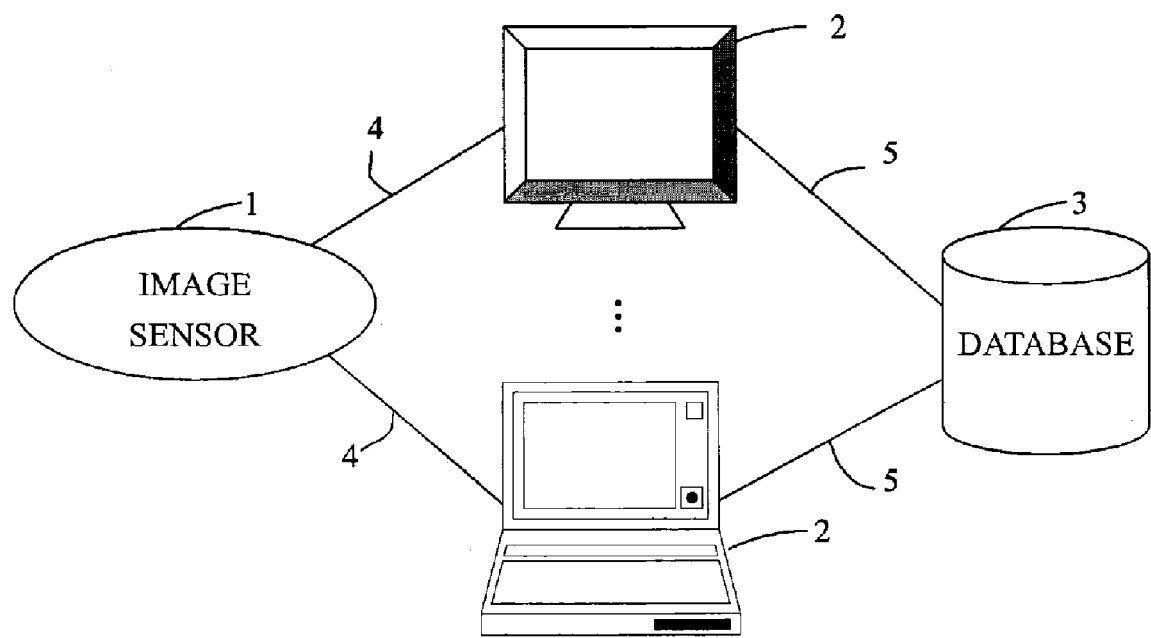
FIG. 1 is a schematic diagram of a hardware configuration of a system for filtering image noise in accordance with a preferred embodiment of the present invention.

FIG. 1 is a schematic diagram of a hardware configuration of a system for filtering image noise (hereinafter, "the system"), in accordance with a preferred embodiment of the present invention. The system includes a plurality of clients 2 (only two shown), an image sensor 1, and a database 3. The image sensor 1 adopts a light sensing technique known as a charged coupled device (CCD) for capturing an image of the object. The clients 2 communicate with the image sensor 1 through a plurality of data cables 4 for acquiring various images of the objects. The clients 2 are used for filtering noise of the images. The data cables 4 are used for transmitting various data, such as videos and images etc.

The clients 2 are further connected with the database 3 via a connection 5. The database 3 is used for storing images after filtering and for storing other data. The connection 5 is a database connectivity, such as an open database connectivity (ODBC) or a Java database connectivity (JDBC).

Figure 2:
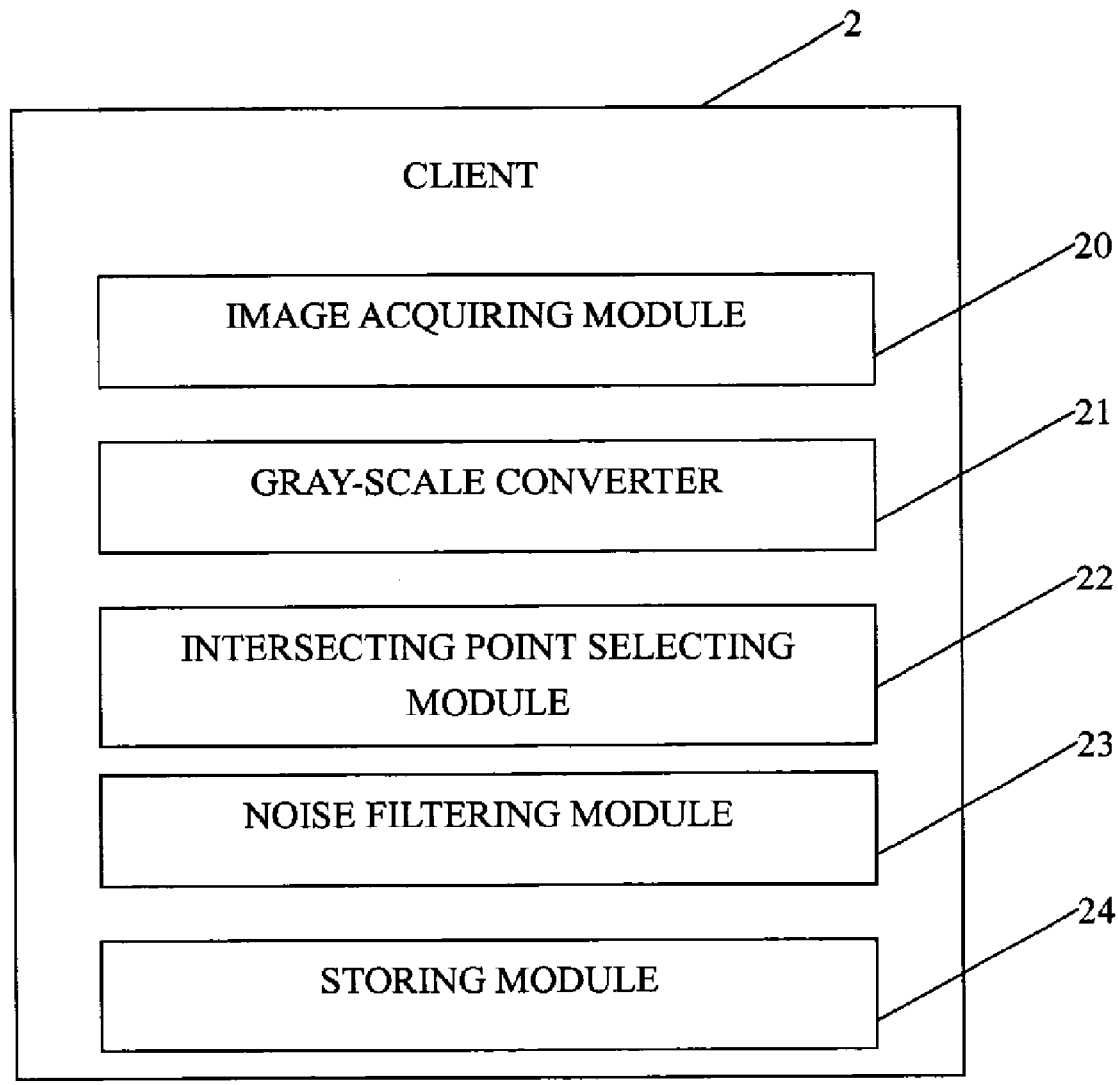
FIG. 2 is a schematic diagram of main software function modules of a client of FIG. 1.

FIG. 2 is a schematic diagram of main software function modules of the client 2. The client 2 includes an image acquiring module 20, a gray-scale converter 21, an intersecting point selecting module 22, a noise filtering module 23 and a storing module 24. The image acquiring module 20 is used for acquiring an image from the image sensor 1 through the data cable 4, and for acquiring other data from the database 3 according to requirements.

The gray-scale converter 21 is used for counting a frequency of each gray-scale value, calculating a distribution range of the gray-scale values and defining a changing range. The gray-scale converter 21 is also used for converting the gray-scale values of the image thereby effectively enhancing a contrast of the image. The gray-scale converter 21 is further used for determining whether the distribution range of the converted gray-scale values is within a defined range, and for sharpening the image to emphasize the image borders. Typically, during the sharpening process, a Laplacian filter is applied by the gray-scale converter 21.

The intersecting point selecting module 22 is used for defining axes perpendicular to the image borders, and for determining gray-scale values of axis points according to an average value filtering method (described in detail below in relation to FIG. 3). The intersecting point selecting module 22 is also used for selecting intersecting points between the image borders and the axes according to a comparing method (described in detail below in relation to FIG. 3), and for creating an object points set, which is a collection set for collecting all the above selected intersecting points. The intersecting point selecting module 22 is further used for inputting the intersecting points into the object points set.

The noise filtering module 23 is used for fitting a geometric character according to the object points set, and for defining a tolerance threshold value according to the geometric character. Fox example, the geometric character can be a line, a circle or an arc, if the geometric character is a line, the tolerance threshold value would be a tenth of a length of the line; if the geometric character is the circle or the arc, the tolerance threshold value would be a tenth of the diameter of the circle or the arc. The noise filtering module 23 is used for calculating a distance from each intersecting point in the object points set to the geometric character, for determining whether the distance is larger than the defined tolerance threshold value. If the distance is larger than the defined tolerance threshold value, the noise filtering module 23 is used for marking the intersecting point as a noise and for deleting the intersecting point from the object points set.

The noise filtering module 23 is also used for creating a new object points set after deleting the intersecting point(s) known as a noise(s) from the object points set, wherein the new object points set is a collection set for collecting the intersecting points whose distance is smaller than the defined tolerance threshold value. The noise filtering module 23 is further used for fitting a new geometric character according to the new object points set, wherein the new geometric character is the image after filtering noises. The storing module 24 is used for storing different kinds of data, such as data of the image after filtering, the object points set, and the geometric character etc.

Figure 3:
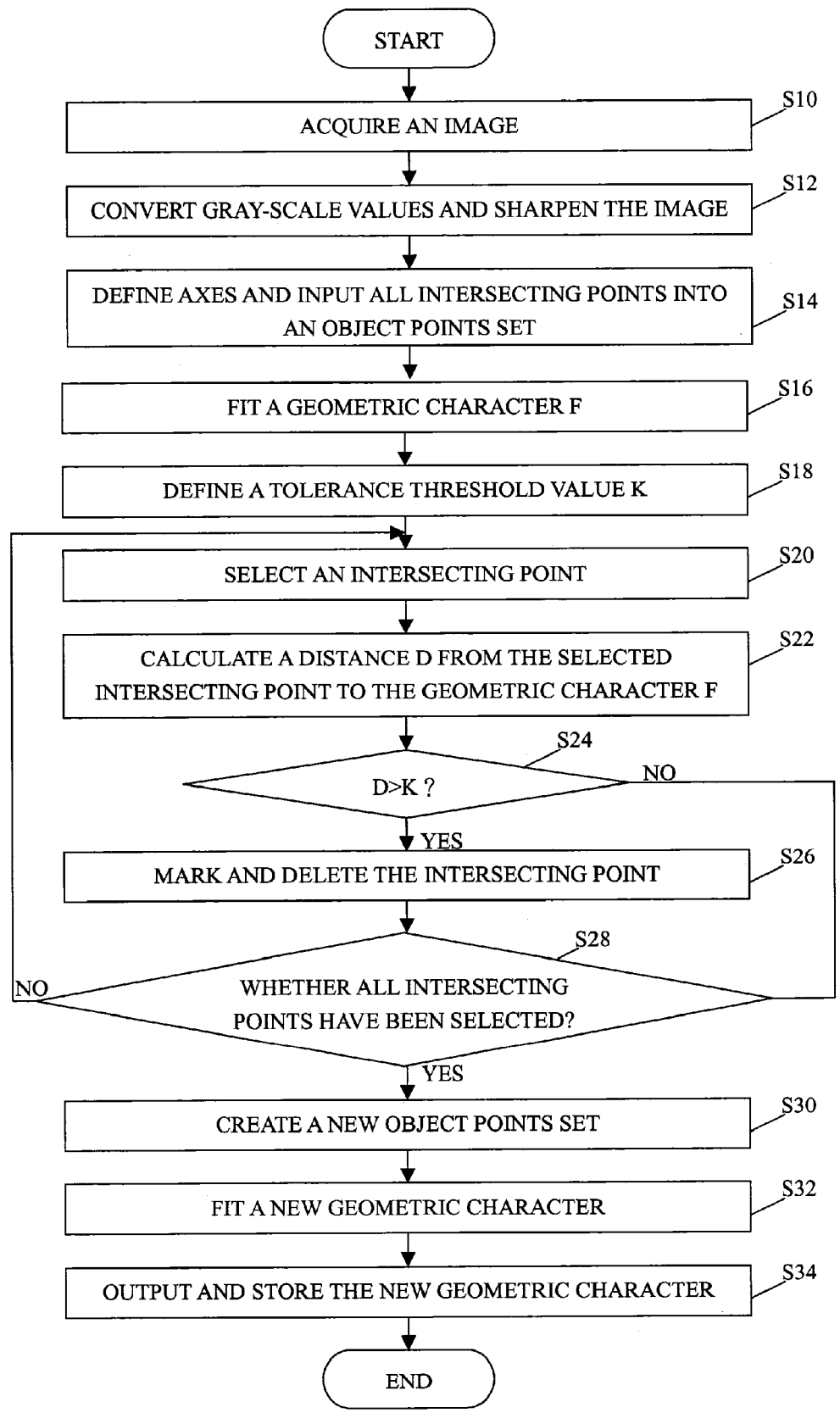
FIG. 3 is a flowchart of a method for filtering image noise.

FIG. 3 is a flowchart of a method for filtering image noise. In step S10, the image acquiring module 20 acquires the image represented by F(x, y) from the image sensor 1 through the data cable 4. In step S12, the gray-scale converter 21 converts the gray-scale values of the image and sharpens the image after gray-scale values conversion (described in detail in relation to FIG. 4). In step S14, the intersecting point selecting module 22 defines the axes perpendicular to the image borders, creates the object points set and inputs all the intersecting points into the object points set (described in detail in relation to FIG. 5).

In step S16, the noise filtering module 23 fits a geometric character F according to the object points set, the geometric character F may be the line, the circle or the arc. In step S18, the noise filtering module 23 defines a tolerance threshold value K. In step S20, the noise filtering module 23 selects one of the intersecting points from the object points set. In step S20, the noise filtering module 23 calculates the distance D from the selected intersecting point to the geometric character F.

In step S24, the noise filtering module 23 determines whether the distance D is larger than the defined tolerance threshold value K. If the distance D is larger than the defined tolerance threshold value K, in step S26, the noise filtering module 23 marks the selected intersecting point as a noise and deletes the selected intersecting point from the object points set. Otherwise, if the distance D is smaller than the defined tolerance threshold value K, the procedure goes directly to step S28.

In step S28, the noise filtering module 23 determines whether all intersecting points in the object points set have been selected. If all the intersecting points in the object points set have been selected, in step S30, the noise filtering module 23 creates the new object points set, the new object points set is a collection set for collecting the intersecting points whose distance is smaller than the defined tolerance threshold value. Otherwise, if there are still intersecting points that have not been selected in the object points set, the procedure returns to step S20 for selecting another intersecting point. In step S32, the noise filtering module 23 fits the new geometric character according to the new object points set, wherein the new geometric character is the image after filtering noises. In step S20, the noise filtering module 23 outputs the new geometric character and the storing module 24 records the new geometric character into the database 3.

The procedure from step S16 to step S32 can be repeated more than once in order to obtain a more accurate image without noises.

Figure 4:
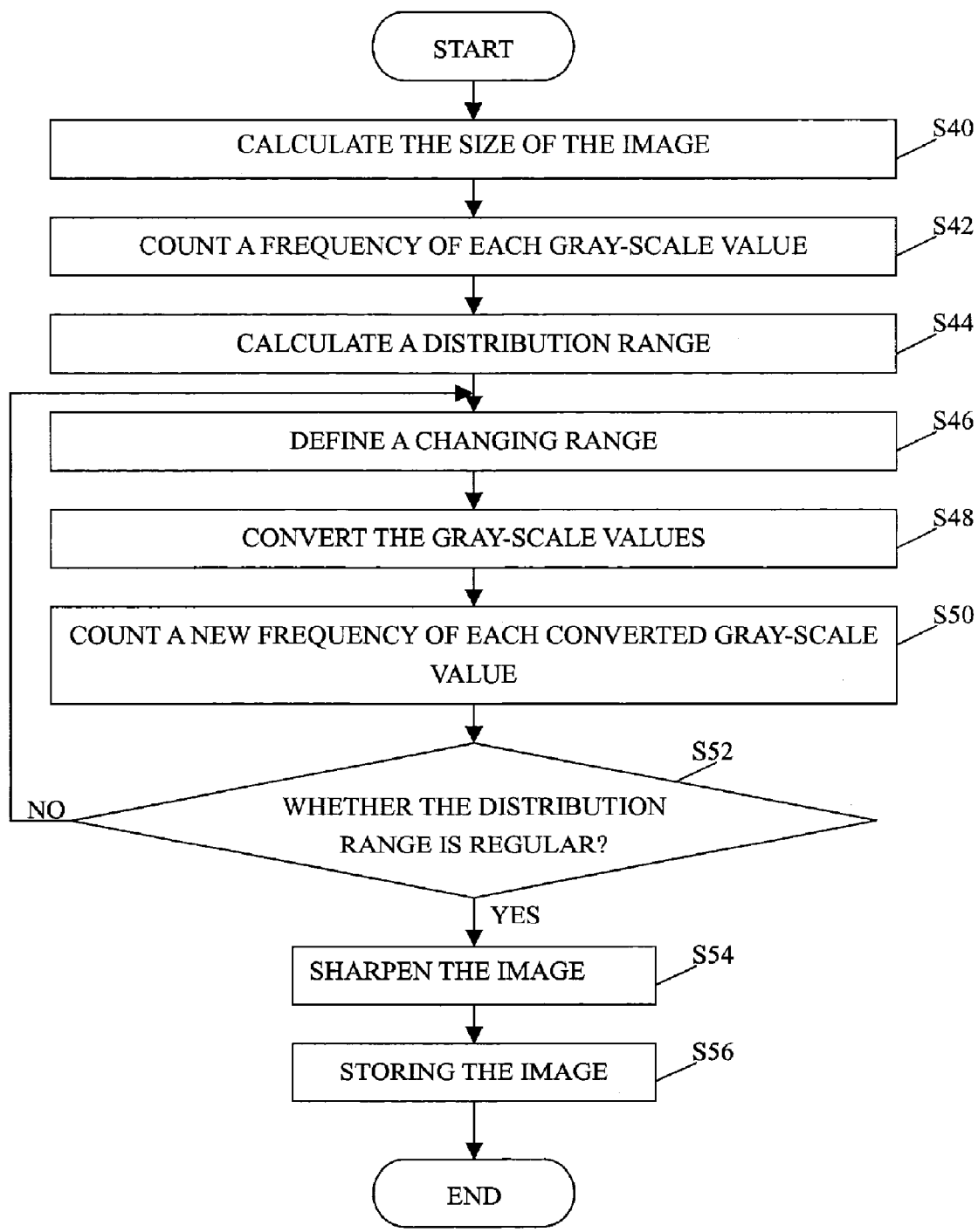
FIG. 4 is a flowchart illustrating step S12 of FIG. 3 in detail, namely converting gray-scale values of the image and sharpening the image.
Figure 6:
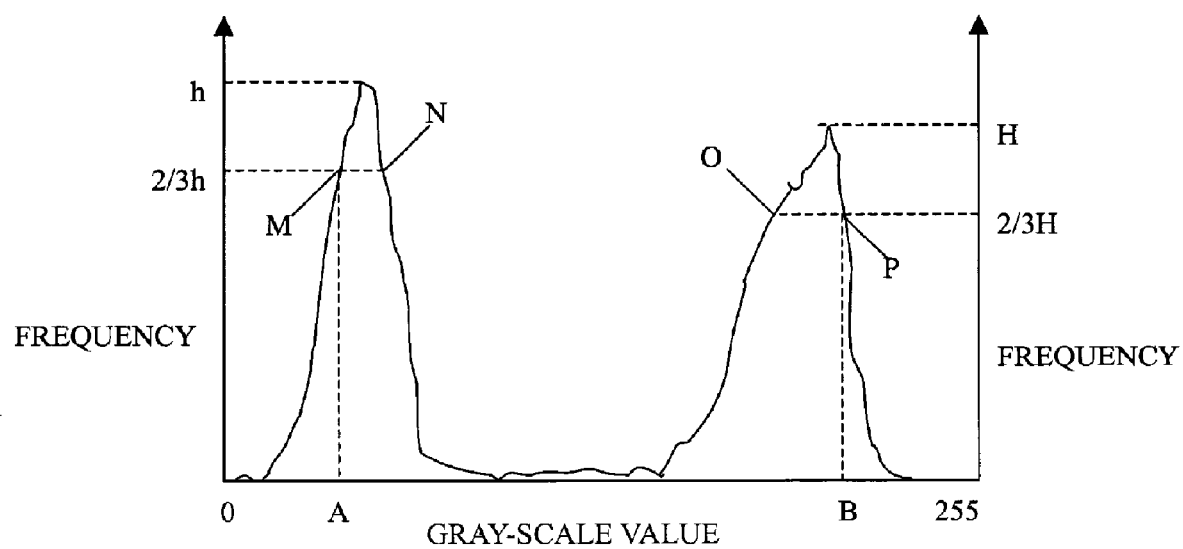
FIG. 6 is a waveform chart of the distribution of the gray-scale values.

FIG. 4 is a flowchart illustrating step S12 of FIG. 3 in detail, namely converting gray-scale values of the image and sharpening the image. In step S40, the gray-scale converter 21 calculates the size of the image by reading a length and a width of the image. In step S42, the gray-scale converter 21 counts the frequency of each gray-scale value of the image, the relation between the frequency and each gray-scale value is shown in FIG. 6. Generally a maximum distribution range of the gray-scale values is [0, 255] (i.e., between about 0 and about 255).

In step S44, the gray-scale converter 21 calculates a distribution range [A, B] of the gray-scale values of the image, the distribution range [A, B] being within the maximal distribution range [0, 255]. The waveform chart as shown in FIG. 6 has two wave crests, of which the left one indicates a concentrated distribution of undertones and the right one indicates a concentrated distribution of dark colors. For example, to assume that the left wave crest corresponds to a frequency h, and determines the ratio of the frequency h as $\frac{2}{3}$h, which corresponds to a point M and a point N near the left wave crest. An abscissa of the point M is selected as a gray-scale value A because point M approaches a gray-scale value 0. For the same reason, it is assumed that the right wave crest corresponds to a frequency H, and determines a ratio of the frequency H as $\frac{2}{3}$H that corresponds to a point O and a point P near the right wave crest, then an abscissa of the point P is selected as a gray-scale value B because point P approaches a gray-scale value 255. The above ratios of the frequency are determined according to the distribution of the gray-scale values, for other examples, the ratios can also determined as $\frac{3}{4}$.

In step S46, the gray-scale converter 21 defines a changing range [C, D] of the gray-scale values, and the changing range [C, D] can be defined as [0, 255] so as to make the differences of the gray-scale values distinct. In step S48, the gray-scale converter 21 converts the gray-scale values of the image according to a linear changing formula:

$$G(x, y) = \frac{(D - C)[F(x, y) - A]}{B - A} + C$$

G (x, y) is used for expressing the image after converting gray-scale values.

In step S50, the gray-scale converter 21 counts a new frequency of each converted gray-scale value. In step S52, the gray-scale converter 21 determines whether the distribution of the converted gray-scale values is regular according to the changing range [C, D]. For example, in the waveform chart shown in FIG. 7, the gray-scale converter 21 determines whether a first frequency corresponding to a gray-scale value C is two-thirds (⅔) of a frequency of the left wave crest, and determines whether a second frequency corresponding to a gray-scale value D is two-thirds (⅔) of a frequency of the right wave crest.

If the distribution of the converted gray-scale values is regular, in step S54, the gray-scale converter 21 sharpens the image to emphasize the image borders thereof. For example, the Laplacian filter is applied in the sharpening process. Otherwise, the procedure returns to step S46 to define a new changing range [C, D]. In step S56, the storing module 24 stores the sharpened image into the database 3.

Figure 5:
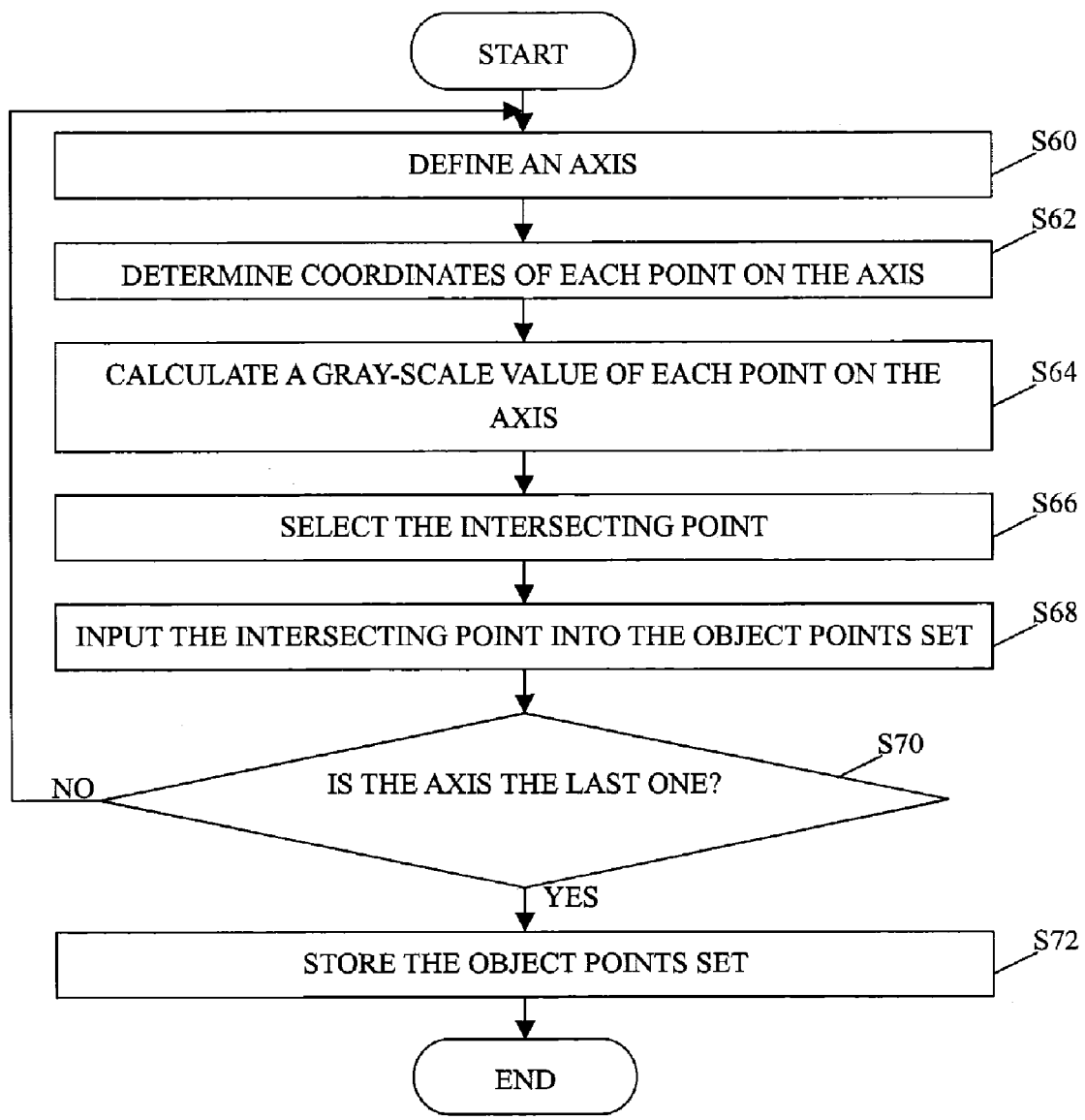
FIG. 5 is a flowchart illustrating step S14 of FIG. 3 in detail, namely defining axes and inputting all intersecting points into an object points set.

FIG. 5 is a flowchart illustrating step S14 of FIG. 3 in detail, namely defining axes and inputting all intersecting points into the object points set. In step S60, the intersecting point selecting module 22 defines the axis perpendicular to the image border. In step S62, the intersecting point selecting module 22 determines coordinates of each axis point.

In step S64, the intersecting point selecting module 22 determines the gray-scale value of each axis point according to the average value filtering method. The average value filtering method includes the steps of: selecting an axis point; determining the coordinates (x, y) of the axis point and a gray-scale value E(x, y) of the axis point; selecting a plurality of nearby points around the axis point (x, y) (as shown in below table); determining the corresponding gray-scale values of the plurality of nearby points; calculating an average value S of the gray-scale values of the plurality of nearby points; determining absolute differences between the average value S and each gray-scale value of the plurality of nearby points; defining a threshold value T being not less than 0; comparing the absolute differences with the threshold value T; and using the average value S to replace the corresponding gray-scale values of the plurality of nearby points if the threshold value T is larger than the absolute differences, or keeping current gray-scale values of the plurality of nearby points if the threshold value T is not larger than the absolute differences.

The plurality of nearby points should be arranged in a symmetrical area, such as a 3*3 square area or a circular area. Suppose that the plurality of nearby points distribute in the 3*3 square area, the intersecting point selecting module 22 selects 8 nearby points around the selected axis point (x, y) and determines the coordinates of the 8 nearby points as shown in the below table:

| (x − 1, y − 1) | (x, y − 1) | (x + 1, y − 1) |
|---|---|---|
| (x − 1, y) | (x, y) | (x + 1, y) |
| (x − 1, y + 1) | (x, y + 1) | (x + 1, y + 1) |

The definition of the threshold value T is determined according to one-tenth of a difference between the distribution range [A, B] that is expressed as T=(B−A)/10. It is a fuzzy technique in image processing by utilizing the threshold value T that would avoid the image borders to be fuzzy. Otherwise, without utilizing the threshold value T, the image borders would be fuzzy if the user uses the average value S to replace the gray-scale values of the plurality of nearby points directly, disadvantageous in filtering the noise of the image.

In step S66, the intersecting point selecting module 22 selects the intersecting point between the axis and the image border according to the comparing method, which includes steps of: comparing gray-scale values of every two continuous axis points, such as comparing the gray-scale values of a fifth axis point (2, 3) and a sixth axis point (3, 4) on the axes; acquiring compared results; selecting a largest compared result; determining the two continuous axis points correspond to the largest compared result, for example, the largest compared result between the gray-scale values of the fifth axis point (2, 3) and the sixth axis point (3, 4); selecting the latter axis point that has the largest gray-scale value compared result as the intersecting point from the two continuous axis points, for example, the sixth axis point is selected as the intersecting point. The objective of the comparing method is to filter isolated points that dissociate from the image borders.

In step S68, the intersecting point selecting module 22 creates the object points set and inputs the intersecting point into the object points set. In step S70, the intersecting point selecting module 22 determines whether the axis is the last perpendicular one to the image borders. If the axis is the last one, in step S72, the storing module 24 stores the object points set into the database 3. Otherwise, if the axis is not the last one, the procedure returns to step S32 to define another axis.

The above procedure of FIG. 5 is used for filtering the isolated points that dissociate from the boundaries.

FIG. 6 is a waveform chart of the distribution of the gray-scale values. As shown, there are two wave crests in the waveform chart, the left one indicates the concentrated distribution of undertones and the right one indicates the concentrated distribution of dark colors.

Figure 7:
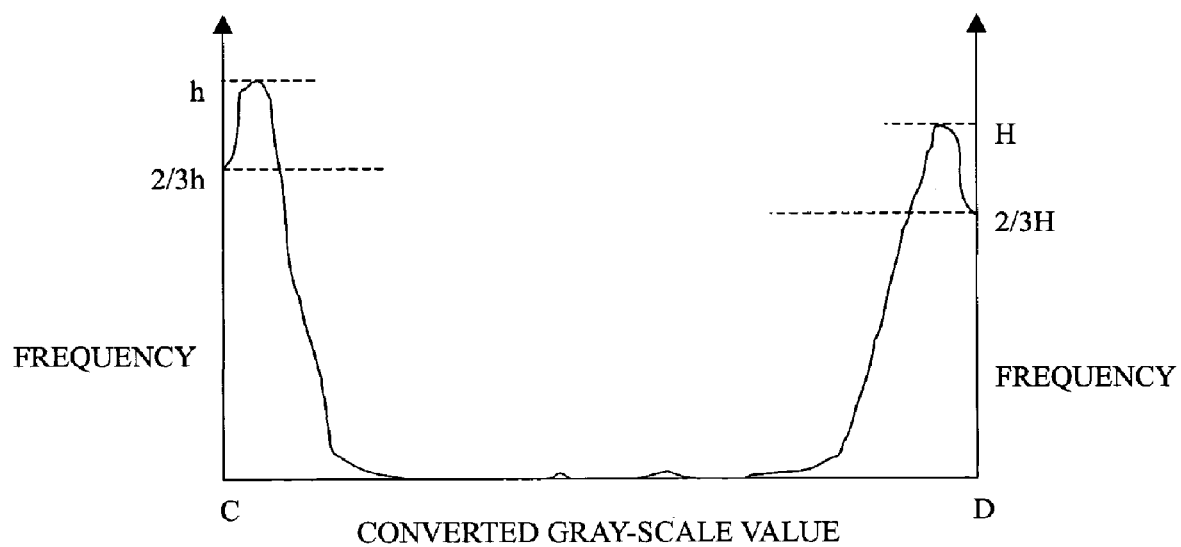
FIG. 7 is a waveform chart of the distribution of the converted gray-scale values.

FIG. 7 is a waveform chart of the distribution of the converted gray-scale values. The converted gray-scale values distribute in the changing range of [C, D].

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A computer-based system for filtering image noise, the system comprising:
    an image sensor for capturing an image;
    a database for storing data;
    an image acquiring module for acquiring the image from the image sensor;
    a gray-scale converter for converting gray-scale values of the image, and for sharpening the image;
    an intersecting point selecting module for defining axes perpendicular to image borders, for determining gray-scale values of axis points by using an average value filtering method, for selecting intersecting points between the image borders and the axes, for creating an object points set, and for inputting the intersecting points into the object points set, the average value filtering method comprising selecting an axis point of one of the axes, and determining coordinates and a gray-scale value of the axis point, calculating an average value of gray-scale values of a plurality of nearby points that around the axis point, determining absolute differences between the average value and each gray-scale value of the plurality of nearby points, defining a threshold value, using the average value to replace corresponding gray-scale value if the threshold value is larger than the absolute difference, or keeping current gray-scale value if the threshold value is not larger than the absolute difference;

a noise filtering module for fitting a geometric character according to the object points set and defining a tolerance threshold value, for calculating a distance from each intersecting point in the object points set to the geometric character, for determining whether the distance is larger than the defined tolerance threshold value, and for marking the intersecting point as a noise and deleting the intersecting point if the distance is larger than the defined tolerance threshold value, for creating a new object points set after deleting the intersecting points known as noises from the object points set, for fitting a new geometric character according to the new object points set; and a storing module for outputting and storing the new geometric character into the database.

2. The system as claimed in claim 1, wherein the gray-scale converter is further used for counting a frequency of each gray-scale value, for calculating a distribution range of the gray-scale values, and for defining a changing range of the gray-scale values.

3. The system as claimed in claim 2, wherein the gray-scale converter is further used for determining whether the distribution of the converted gray-scale values is regular according to the changing range, and for sharpening the image if the distribution of the converted gray-scale values is irregular.

4. A computer-implemented method for filtering image noise, the method comprising the steps of:
   acquiring an image from an image sensor;
   converting gray-scale values of the image and sharpening the image;
   defining axes perpendicular to image borders and determining a gray-scale value of each axis point of each of the axes, comprising following sub-steps:
   (1) selecting an axis point of one of the axes, and determining coordinates and a gray-scale value of the axis point;
   (2) calculating an average value of gray-scale values of a plurality of nearby points that around the axis point;
   (3) determining absolute differences between the average value and each gray-scale value of the plurality of nearby points;
   (4) defining a threshold value;
   (5) using the average value to replace corresponding gray-scale value if the threshold value is larger than the absolute difference, or keeping current gray-scale value if the threshold value is not larger than the absolute difference; and
   (6) repeating sub-step (1) to sub-step (5) until all axes points of all axes perpendicular to the image borders are selected;
   selecting intersecting points between the axes and the image borders;
   creating an object points set and inputting all the intersecting points into the object points set;
   fitting a geometric character according to the object points set;
   defining a tolerance threshold value;
   selecting an intersecting point from the object points set;
   calculating a distance from the selected intersecting point to the geometric character;
   determining whether the distance is larger than the defined tolerance threshold value;
   marking the selected intersecting point as a noise if the distance is larger than the defined tolerance threshold value;
   deleting the selected intersecting point from the object points set;
   creating a new object points set if all the intersecting points in the object points set have been selected;
   fitting a new geometric character according to the new object points set; and
   outputting and storing the new geometric character into a database.

5. The method according to claim 4, wherein the geometric character is a line, and the tolerance threshold value is a tenth of the length of the line.

6. The method according to claim 4, wherein the geometric character is one of a circle or an arc, the tolerance threshold value is a tenth of the diameter of the one of the circle or the arc.

7. The method according to claim 4, further comprising the steps of:
   determining whether all the intersecting points in the object points set have been selected;
   returning to the selecting step for selecting another intersecting point in the object points set if there are intersecting points have not been selected.

8. The method according to claim 7, wherein the step of determining whether the distance is larger than the defined tolerance threshold value comprises the step of executing the step of determining whether all intersecting points in the object points set have been selected if the distance is not larger than the defined tolerance threshold value.

9. The method according to claim 4, wherein the converting step comprises the steps of:
   calculating a size of the image by reading the length and the width of the image;
   counting a frequency of each gray-scale value of the image;
   calculating a distribution range of the gray-scale values of the image;
   defining a changing range of the gray-scale values;
   converting the gray-scale values of the image according to a particular linear changing formula;
   counting a new frequency of each converted gray-scale value;
   determining whether the distribution of the converted gray-scale values is regular according to the changing range; and
   sharpening the image if the distribution of the converted gray-scale values is regular.

10. The method according to claim 9, wherein the determining step comprises the step of returning to the step of defining a changing range of the gray-scale values, if the distribution of the converted gray-scale values is irregular.

11. The method according to claim 4, wherein the plurality of nearby points are arranged in a symmetrical area.

12. The method according to claim 4, wherein the definition of the threshold value is determined according to one-tenth of a difference between the distribution ranges.

13. The method according to claim 4, wherein the step of selecting intersecting points between the axes and the image borders comprises the steps of:
- comparing gray-scale values of every two continuous axis points;
- acquiring compared results;
- selecting a largest compared result;
- determining the two continuous axis points correspond to the largest compared result; and
- selecting the latter axis point that has the largest gray-scale value compared result as the intersecting point from the two continuous axis points.

14. The system as claimed in claim 1, wherein the intersecting point selecting module selects the intersecting points between the image borders and the axes by comparing gray-scale values of every two continuous axis points, acquiring compared results, selecting a largest compared result, determining the two continuous axis points correspond to the largest compared result, and selecting the latter axis point that has the largest gray-scale value compared result as the intersecting point from the two continuous axis points.

15. The system as claimed in claim 1, wherein the geometric character is a line, and the tolerance threshold value is a tenth of the length of the line.

16. The system as claimed in claim 1, wherein the geometric character is one of a circle or an arc, the tolerance threshold value is a tenth of the diameter of the one of the circle or the arc.

17. The system as claimed in claim 1, wherein the plurality of nearby points are arranged in a symmetrical area.

18. The system as claimed in claim 1, wherein the definition of the threshold value is determined according to one-tenth of a difference between the distribution ranges.

* * * * *